US012676845B2

(12) United States Patent
Guionneau

(10) Patent No.: US 12,676,845 B2
(45) Date of Patent: Jul. 7, 2026

(54) METHOD AND SYSTEM FOR AUTHENTICATING A USER TO ACCESS A WEB APPLICATION HOSTED ON AN APPLICATION SERVER

(71) Applicant: BULL SAS, Les Clayes-sous-bois (FR)

(72) Inventor: Christophe M. Guionneau, Grenoble (FR)

(73) Assignee: BULL SAS, Les Clayes-sous-Bois (FR)

( * ) Notice: Subject to any disclaimer, the term of this patent is extended or adjusted under 35 U.S.C. 154(b) by 33 days.

(21) Appl. No.: 18/827,469

(22) Filed: Sep. 6, 2024

(65) Prior Publication Data

US 2025/0106196 A1      Mar. 27, 2025

(30) Foreign Application Priority Data

Sep. 21, 2023    (EP) ..................................... 23306572

(51) Int. Cl.
| | |
|---|---|
| *H04L 9/40* | (2022.01) |
| *H04W 12/02* | (2009.01) |
| *H04W 12/06* | (2021.01) |
| *H04W 12/084* | (2021.01) |

(52) U.S. Cl.
CPC ................................ *H04L 63/0807* (2013.01)

(58) Field of Classification Search
CPC .................................................... H04L 63/0807
USPC ............................................................. 726/9
See application file for complete search history.

(56) References Cited

U.S. PATENT DOCUMENTS

| | | | | |
|---|---|---|---|---|
| 2014/0007198 A1* | 1/2014 | Durbha | ................. | H04L 63/102 |
| | | | | 726/4 |
| 2015/0058960 A1* | 2/2015 | Schmoyer | ........... | H04L 63/0823 |
| | | | | 726/8 |
| 2016/0337351 A1* | 11/2016 | Spencer | .............. | H04L 63/0876 |
| 2018/0309756 A1* | 10/2018 | Chen | ........................ | G06F 21/41 |
| 2019/0020659 A1* | 1/2019 | Loni | ..................... | H04L 63/105 |
| 2020/0145385 A1* | 5/2020 | Chauhan | ............. | H04L 63/0281 |
| 2021/0044976 A1* | 2/2021 | Avetisov | .............. | H04W 12/08 |
| 2021/0258308 A1* | 8/2021 | Avetisov | .............. | H04L 9/0825 |

(Continued)

FOREIGN PATENT DOCUMENTS

EP        3386145        10/2018

OTHER PUBLICATIONS

Michael Dalton; Nemesis: Preventing Authentication & Access Control Vulnerabilities in Web Applications; USENEX; 2009; p. 1-16.*

(Continued)

*Primary Examiner* — Monjur Rahim
(74) *Attorney, Agent, or Firm* — ARC IP Law, PC; Joseph J. Mayo

(57) ABSTRACT

The invention relates to a method for authenticating a user to access a web application, including reception, by an application server, of an access request; redirection to an IDAAS authentication server; authentication of said user with a social authentication server selected from said IDAAS server, reception by said IDAAS server of said user's personal data, verification of personal data, and when the personal data satisfies at least one web application access rule, transmission of a proof of authentication authorizing said user to access said web application. It also relates to a computer program and an authentication system implementing such a method.

13 Claims, 2 Drawing Sheets

(56) References Cited

U.S. PATENT DOCUMENTS

2023/0171254 A1* 6/2023 Guionneau ......... H04L 63/0884
726/5

OTHER PUBLICATIONS

European Search Report and Written Opinion issued in EP23306572.1 on Mar. 1, 2024.
Fett Daniel et al, "SPRESSO: A Secure, Privacy-Respecting Single Sign-on System for the Web" published on Oct. 12, 2015.

* cited by examiner

METHOD AND SYSTEM FOR AUTHENTICATING A USER TO ACCESS A WEB APPLICATION HOSTED ON AN APPLICATION SERVER

This application claims priority to European Patent Application Number 22306572.1, filed 21 Sep. 2023, the specification of which is hereby incorporated herein by reference.

BACKGROUND OF THE INVENTION

Field of the Invention

At least one embodiment of the invention concerns a method for authenticating a user to access a web application on an application server. At least one embodiment of the invention also relates to a computer program and a system implementing such a method.

The field of the invention is the field of user authentication in order to access web applications.

Description of the Related Art

Access to a web application, whether via an Internet browser or via a client application running on a user device, such as a smartphone or tablet, requires authentication data, such as a user ID and password. In addition to this authentication data, access to certain applications is contingent on rules relating to the user's profile, that is, the user's personal data, such as the user's age, location, nationality, etc. This means that the user is required to provide personal data when accessing these applications, or when creating a user account for these applications, which raises issues of user data confidentiality.

An alternative solution is to use a third-party authentication service, called a social authentication service, such as FranceConnect®, a social network like Facebook®, etc. The user creates an account with the social authentication service and provides their personal data. Then, to access a particular web application, the user authenticates with the third-party authentication service, which then transmits the user's personal data to each web application the user wishes to access. This eliminates the need for users to enter their personal data in each application, but does not prevent them from communicating their personal data to each web application. Sometimes, the social authentication service even transmits more of the user's personal data than is necessary for access to the web application. What's more, the social authentication service knows which application the user wishes to access and can, potentially, track/trace the user's activity over time and know which applications the user is accessing. In addition to the problem of personal data confidentiality, this solution presents a problem of user activity confidentiality.

One aim of at least one embodiment of the invention is to solve at least one of the above-mentioned shortcomings.

Another aim of at least one embodiment of the invention is to provide a solution for authenticating a user to access a web application, enabling greater confidentiality of the user's personal data.

It is also a goal of one or more embodiments of the invention to provide a solution for authenticating a user to access a web application, enabling greater confidentiality of the user's activity.

BRIEF SUMMARY OF THE INVENTION

At least one embodiment of the invention makes it possible to achieve at least one of the aforementioned aims with a method for authenticating a user to access a web application hosted on an application server, said method comprising an authentication phase comprising the following steps:

reception, by said application server, of a request for access to said web application formulated by the user through a user device;

redirection of said user to a first authentication server, said IDAAS server;

selection, by said user and on said IDAAS server, of a second authentication server, said social server, holding the user's personal data;

authentication of said user with said selected social authentication server;

reception by said IDAAS server of personal data of said user transmitted by said social server;

verification of the user's personal data according to at least one previously entered rule for accessing said web application; and when the personal data satisfies at least one access rule, transmission from said IDAAS server to said application server of a proof of authentication authorizing said user to access said web application.

In other words, at least one embodiment of the invention proposes to authenticate a user using a social server, but through the intermediary of an IDAAS server. Personal data held by the social server is transmitted to the IDAAS server, but not to the application server. The IDAAS server tests the user's personal data to determine whether it complies with the application access rules, without transmitting this personal data to the application server: the application server therefore does not receive the personal data held by the social server. Thus, the at least one embodiment of the invention enables greater security of personal data, and greater control over the dissemination, or sharing, of this data with application servers.

What's more, the social server receives no indication of which application the user wishes to access. This information is not shared by the IDAAS server with the social server. Thus, on the social server side, it is not possible to know which application the user wishes to access, which means greater confidentiality for the user. What's more, under these conditions, it is not possible for the social server to track which applications the user accesses over time, enabling greater confidentiality of user activity over time, compared with current solutions.

Thus, compared with current solutions, the authentication solution according to one or more embodiments of the invention enables greater confidentiality of the user's personal data and activity.

A "web application" can be a website, or a web page, hosted on an application server, and accessed through a web browser run by the user device.

A "web application" can be an application hosted on an application server and accessed via an application client running locally on a user device, for example, a smartphone, tablet, computer, etc.

In one or more embodiments, the proof of authentication may comprise an authentication token.

The authentication token may comprise data indicating that the user's personal data satisfies the web application access rule(s) previously entered.

In one or more embodiments, the authentication token may comprise a temporary identifier assigned to the user by the IDAAS server.

This temporary identifier can be used for user access to the web application. In this way, the user is not obliged to provide a personal identifier to the web application, and uses the temporary identifier provided by the IDAAS server. This ensures greater confidentiality when the user accesses the web application.

In one or more embodiments, the proof of authentication may comprise at least one data item, called test data, obtained by testing at least one personal data item against at least one access rule.

For example, when an access rule consists of an age condition, for example "age>18", the proof of authentication may comprise data relating to the test of this rule against the user's age, for example data of the "age OK" or "age>18" type, without indicating the user's age. Of course, this example is provided for purposes of illustration only and is in no way limiting.

The at least one test data item can be transmitted to the application server in the form of an information token.

According to one or more embodiments, the authentication phase may comprise, prior to the step of transmitting at least one test data item, a step of requesting confirmation from said user.

In this way, the user has complete control over the data communicated by the IDAAS server to the application server.

According to one or more embodiments, prior to the authentication phase, the method according to at least one embodiment of the invention may comprise a step of enrolling the web application with said IDAAS server, said enrollment step indicating at least one rule for accessing said application.

In particular, when the web application enrolls with the IDAAS server, it indicates the rule(s) applicable to a user's profile, and therefore to the user's personal data, conditioning access to said application.

At least one access rule may relate to at least one of the following data items:

the user's age. For example, a rule can make access to the application contingent on a minimum age, for example, a minimum age of 18. Such a condition can be defined for various reasons, for example depending on the nature of the application's content;

the user's location: for example, a rule can make access to the application contingent on a country or region, such as France or Europe. Such a condition can be defined for various reasons, for example for data security or protection against piracy;

a user's nationality: for example, a rule can make access to the application contingent on a user's nationality, for example, French. Such a condition may be defined for a variety of reasons, such as access rights;

etc.

Of course, these examples are provided for purposes of illustration only and are in no way limiting.

In one or more embodiments, during the enrollment step, further data can be provided by the web application.

For example, the web application can provide a return URL to be used when the IDAAS server communicates the proof of authentication, or to redirect the user to the web application when the authentication phase has been completed.

In a non-limiting example, in at least one embodiment, the web application provides any combination of the following data:

an application name;

a description in several languages if necessary;

a main URL for the application;

an authentication return URL, also known as a callback URL in the OpenID Connect protocol (OIDC), a URI for a thick application. There may be several callback URLs or URIs;

one or more of the client application's cryptographic and OIDC flow parameters, one or more types of private data requested from the list of possible data types, one or more access rules relating to the user's profile, that is, relating to the user's personal data.

etc.

In one or more embodiments, the web application can obtain one or more data items at the end of the enrollment stage.

In a non-limiting example, in at least one embodiment, the web application may obtain any combination of the following data:

an application identifier, known as ClientID, for example an identifier to be used in an OIDC (OpenID Connect) protocol;

a secret, which it can optionally modify, for example a secret to be used in an OIDC protocol;

one or more redirect URLs, for example one or more redirect URLs for use in an OIDC protocol.

In one or more embodiments of the method according to at least one embodiment of the invention, the authentication phase may comprise a step of creating a temporary profile for said user on the IDAAS server.

Thus, the user has a profile on the IDAAS server, and at least some of the data processed by the IDAAS server can be stored in, or in association with, said user profile. This provides greater security for this data, which is protected in the temporary user profile associated with the user.

The method according to one or more embodiments of the invention may comprise a step of deleting the temporary profile after the authentication phase.

This ensures greater confidentiality, both of the user's personal data and of the user's activity.

Thus, no data that relates to the web application, the user or, more generally, user authentication is stored on the IDAAS server. In particular, the IDAAS server does not store any of the user's personal data, nor any data relating to the web application the user wishes to access. Preferably, all data received, sent or generated for the purposes of user authentication is deleted.

The temporary profile can be deleted as soon as the authentication phase is complete, for example at the same time as, or just after, the IDAAS server transmits the proof of authentication to the application server.

Alternatively, in at least one embodiment, the temporary profile can be deleted after a short period of time, for example a few minutes, and in particular five (5) minutes, after the authentication phase.

In one or more embodiments, a social server can be selected from a number of social servers listed by the IDAAS server.

Thus, the user can choose which social server to use.

In one or more embodiments, the user can be authenticated with the social server using any authentication technique, for example using a user ID and password that the user provides to the social server.

When the IDAAS server redirects the user to the social server, it can indicate to the social server a callback URL to use when the user's authentication with the social server is complete.

Data can be exchanged between the IDAAS server and the social server using any known technique.

In one or more embodiments, data can be exchanged between the IDAAS server and the social server using OIDC or SAML (Security Assertion Markup Language) authentication kinematics between said IDAAS server and said social server.

In particular, the redirection(s) between the IDAAS server and the social server can be performed using OIDC or SAML authentication kinematics between said IDAAS server and said social server.

Data can be exchanged between the IDAAS server and the application server using any known technique.

In one or more embodiments, data can be exchanged between the IDAAS server and the application server using OIDC or SAML authentication kinematics between said IDAAS server and said application server.

In particular, the redirection(s) between the IDAAS server and the application server can be performed using OIDC or SAML authentication kinematics between said IDAAS server and said social server.

The method according to one or more embodiments of the invention may comprise a step for creating a user account on the application server, after the authentication phase.

Thus, the next time the user logs on, they can access the application using this user account, and can dispense with authentication in accordance with at least one embodiment of the invention.

According to one or more embodiments, the personal data may comprise at least one of the following data:

the user's age.

the user location, the user's nationality, etc.

Of course, these examples are provided for purposes of illustration only and are in no way limiting.

According to at least one embodiment of the invention, a non-transitory computer program is proposed comprising computer instructions, which when they are executed, implement the steps of the authentication method according to one or more embodiments of the invention.

The computer program can be in machine language, in C, C++, JAVA, Python, and more generally any type of computer language.

The computer program can be a single program, or a set of several programs communicating together.

In particular, the computer program can comprise:

a first authentication client for managing access to a web application, in particular installed on an application server, a second authentication-as-a-service client installed on an IDAAS server, and a third authentication client, known as a social authentication client, in particular installed on a social authentication server;

According to at least one embodiment of the invention, a system is proposed comprising:

a first authentication client for managing access to a web application, in particular installed on an application server, a second authentication-as-a-service client installed on an IDAAS server, and a third authentication client, known as a social authentication client, in particular installed on a social authentication server;

configured to implement the method according to one or more embodiments of the invention.

The system according to one or more embodiments of the invention may comprise, in terms of technical means and/or configuration and/or computer programs, any combination of the features described above with reference to the method according to one or more embodiments of the invention and which are not mentioned herein for brevity.

The system according to at least one embodiment of the invention may comprise the application server.

The system according to at least one embodiment of the invention may comprise the IDAAS server.

The system according to at least one embodiment of the invention may comprise the social server.

BRIEF DESCRIPTION OF THE DRAWINGS

Other benefits and features shall become evident upon examining the detailed description of an entirely non-limiting embodiment, and from the enclosed drawings in which.

DETAILED DESCRIPTION OF THE INVENTION

It is clearly understood that the one or more embodiments that will be described hereafter are by no means limiting. In particular, it is possible to imagine variants of the one or more embodiments of the invention that comprise only a selection of the features disclosed hereinafter in isolation from the other features disclosed, if this selection of features is sufficient to confer a technical benefit or to differentiate the one or more embodiments of the invention with respect to the prior state of the art. This selection comprises at least one preferably functional feature which lacks structural details, or only has a portion of the structural details if that portion only is sufficient to confer a technical benefit or to differentiate the one or more embodiments of the invention with respect to the prior state of the art.

In the figures, the same reference has been used for the features that are common to several figures.

Figure 1:
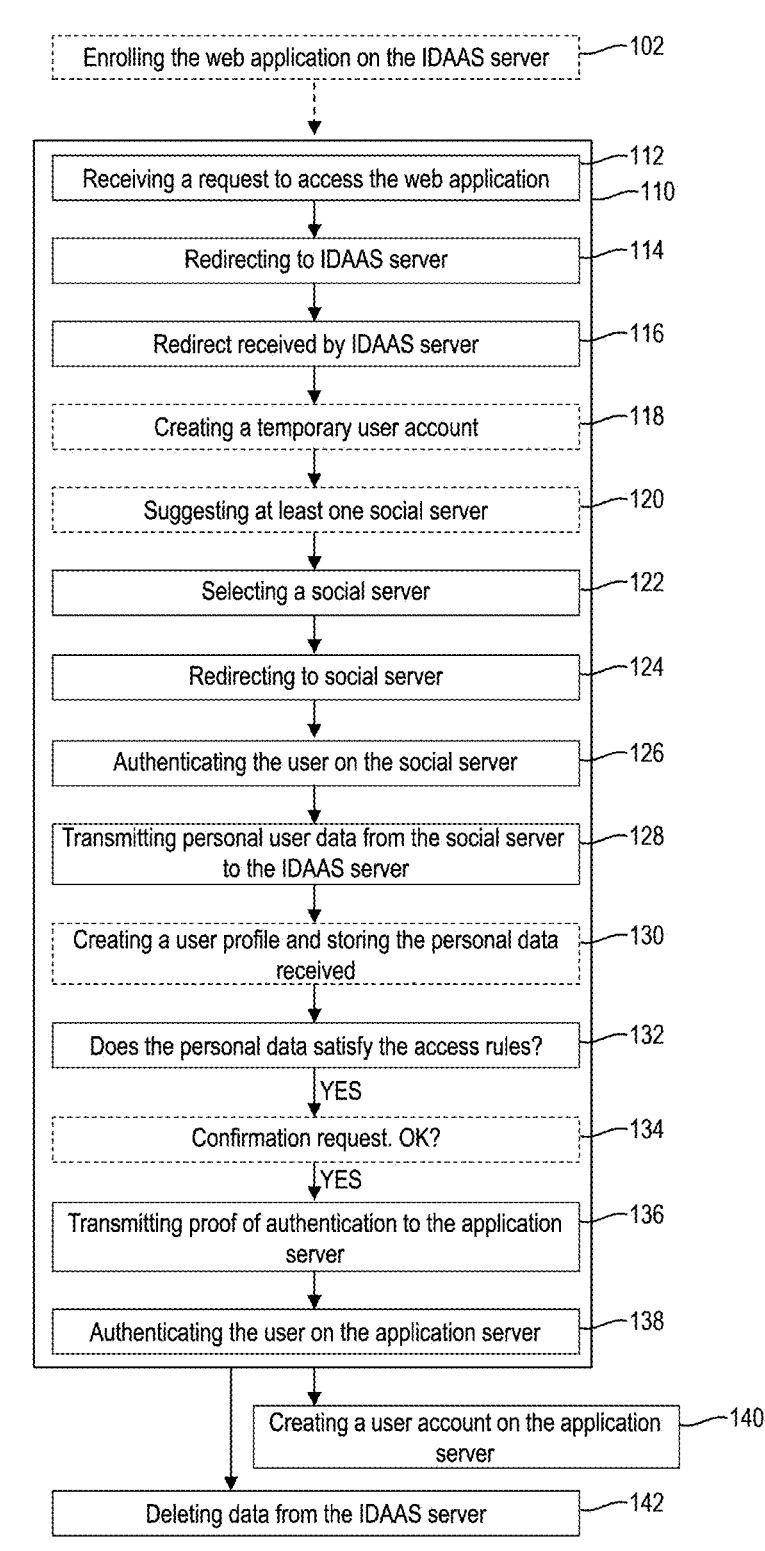
FIG. 1 is a schematic depiction of a non-limiting example of an authentication method according to one or more embodiments of the invention.

FIG. 1 is a schematic depiction of a non-limiting example of an authentication method according to one or more embodiments of the invention.

The method 100, depicted in FIG. 1, can be implemented to authenticate a user to access a web application, either through a web browser run by a user device, or through an application client run by said user device.

The user device can be of any type, such as a smartphone, tablet, computer, etc.

The web application can be of any type, such as a website, an Internet page, an e-mail application, an office application, a music streaming service, a video content streaming service, etc.

The method 100 may comprise an optional step 102 to register the web application with an IDAAS server, in order to be able to offer its users authentication in accordance with at least one embodiment of the invention. This enrollment step 102 is optional, as it can be carried out upstream and may not be part of the method according to one or more embodiments of the invention for at least one user.

To enroll, the web application can provide any combination of the following data:

an application name;

a description in several languages if necessary;

a main URL for the application;

an authentication return URL, also known as a callback URL in the OpenID Connect protocol, a URI for a thick application. There may be several callback URLs or URIs;

one or more of the client application's cryptographic and OIDC flow parameters, one or more types of private data requested from the list of possible data types, at least one access rule relating to the user's profile, that is, relating to the user's personal data.

etc.

Meanwhile, in response to enrollment, the web application may obtain any combination of the following data items:

an application identifier, known as ClientID;

a secret, which they can optionally modify;

one or more redirect URLs.

At the end of the enrollment stage, the application can propose authentication via the IDAAS server to each user wishing to access the application.

The enrollment step can be initiated and carried out by an administrator or owner of the web application, an administrator or owner of the application server hosting the web application, etc.

The enrollment step can be carried out well in advance of a web application access request, and can be completely uncorrelated in time with a web application access request.

The method 100 comprises an authentication phase 110.

The authentication phase 110 comprises a step 112 for receiving a request to access the web application that is already enrolled. This request is received by the application server.

Such an access request can take any form. For example, the access request may be the inputting of a web application access URL into a browser running on the user device, or a launch of an application client running on the user device.

After receiving the access request, the application server redirects the user to the IDAAS server in step 114. In other words, the access request is redirected by the application server to the IDAAS server. This redirection comprises at least one web application identifier, namely the ClientID, obtained during the enrollment step. In at least one embodiment, the redirection is automated. In at least one embodiment, a web application page or message can prompt the user to choose the authentication mode: conventional authentication or authentication via the IDAAS server. The redirection is carried out when the user chooses authentication via the IDAAS server.

In one or more embodiments, this redirection is carried out using the OIDC ("OpenID Connect") protocol or the SAML ("Security Assertion Markup Language") protocol.

In a step 116 of the authentication phase 110, the IDAAS server receives the redirection and identifies the web application by means of the identifier of said web application contained in the redirection message.

In a step 118 of the authentication phase 110, a temporary account is created by the server to host the user's authentication data for the web application. A temporary identifier is assigned to the user.

In an optional step 120 of the authentication phase 110, the IDAAS server displays a web page or message, offering the user at least one third-party authentication server/service, known as a social authentication server/service. Such an authentication service/server could, for example, be FranceConnect®, a social network such as Facebook®, Google®, etc. Alternatively, the IDAAS server can offer a single social authentication service.

The authentication phase 110 comprises a step 122 in which the user selects a social authentication service/server with which that person has an account and which holds the user's personal data. For example, the user selects one of several social authentication services, or by confirming the only social authentication service offered by the IDAAS.

This step 122 is performed because the IDAAS server doesn't know the user and therefore can't know on which social server the user has a user account.

In step 124 of the authentication phase 110, the IDAAS server redirects the user to the server associated with the chosen social authentication service, also known as the social authentication server or social server. In other words, the user is redirected to a social server URL known to the IDAAS.

This redirection may comprise at least one identifier of the IDAAS server. This redirection may comprise at least one of the following data items:

at least one callback URL, enabling the social server to transmit to the IDAAS server the user's personal data known to the social server, in the event that the user successfully authenticates to said social server;

a temporary user identifier or transaction identifier;

possibly, a list of personal data requested by the IDAAS server, this list of data being previously defined by the web application to which the user wishes to access, for example, during the enrollment stage;

etc.

This redirection may comprise data other than that mentioned above.

In some cases, in one or more embodiments, this redirection is carried out using the OIDC ("OpenID Connect") protocol or the SAML ("Security Assertion Markup Language") protocol.

In a step 126 of the authentication phase 110, the user authenticates himself to the social server, using any authentication technique, for example by providing an identifier and a password, or using multifactor authentication, etc.

When the user successfully authenticates to the social server, the user's personal data, held by the social server, is transmitted by the social server to the IDAAS server, in a step 128 of the authentication phase 110. This data is transmitted to the IDAAS server, for example, in the form of at least one OAuth token, of the 'access token', 'refresh token' and 'information token' type.

Optionally, in step 130, the IDAAS server creates a temporary profile for the user, optionally attached to any temporary account created in step 118. The personal data received is stored in the temporary profile.

In a step 132, the IDAAS server determines whether the personal data received satisfies the at least one web application access rule, said at least one rule being satisfied when the web application is enrolled with the IDAAS server.

If this is not the case, the method 100 is terminated.

If this is the case, the authentication phase 110 continues.

In an optional step 134 of the authentication phase 110, the IDAAS server asks the user to confirm the information they are about to communicate to the application server. If the user disagrees, they are put through the method 100. Otherwise, the method 100 continues.

In a step 136 of the authentication phase 110, the IDAAS server transmits the user's temporary identifier and a proof of authentication to the application server.

In at least one embodiment, the proof of authentication may comprise an authentication token indicating that the user's personal data satisfies the web application access rule(s).

Optionally, the proof of authentication may comprise at least one data item, called test data, obtained by testing at least one personal data item against at least one access rule. For example, when an access rule consists of an age condition, for example "age>18", the proof of authentication may comprise data relating to the test of this rule against the user's age, for example data of the "age OK" or "age>18" type, without indicating the user's exact age. Of course, this example is provided for purposes of illustration only and is in no way limiting.

The at least one test data item can be transmitted to the application server in the form of an information token.

In a step 138 of the authentication phase 110, the user is authenticated on the application server with their temporary identifier and the proof of authentication. That person can access the web application.

The authentication phase 110 is complete.

In the example shown in FIG. 1, by way of at least one embodiment, the method 100 may comprise, after the authentication phase 110, a step 140 of creating a user account with the application server to access the web application. So, the next time the user logs on, they can access the web application using this user account, and can dispense with authentication involving the IDAAS server and/or a social server.

In the example shown in FIG. 1, by way of at least one embodiment, the method 100 may comprise, after the authentication phase, a step 142 of deleting the user profile, their temporary identifier and, if applicable, their temporary account.

Preferably, in at least one embodiment, during the step 142, all data manipulated by the IDAAS server is deleted so as to leave no trace of the user and the web application, social server, etc. This deletion step 142 can be carried out just after the end of the authentication phase 110. Alternatively, this deletion step 142 can be carried out after a predetermined short time, for example, 5 minutes, following the end of the authentication phase 110.

Figure 2:
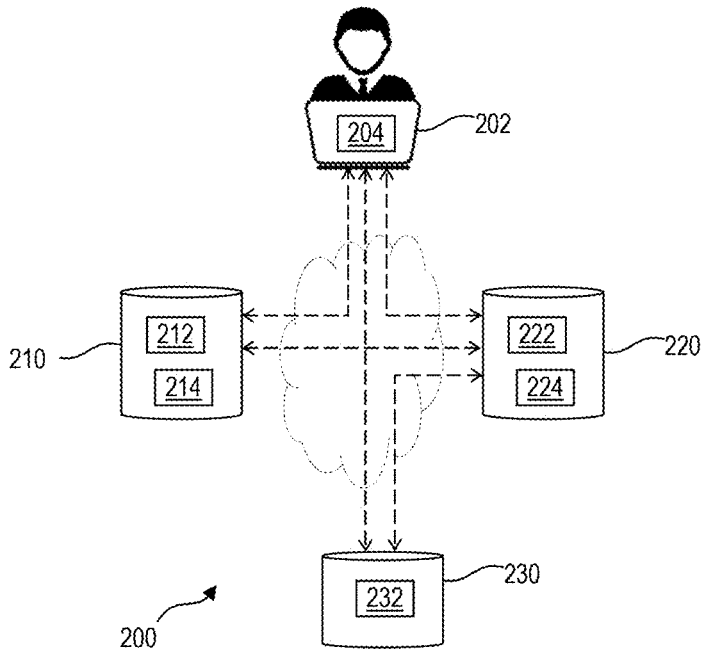
FIG. 2 is a schematic depiction of a non-limiting example of an authentication system according to one or more embodiments of the invention.

FIG. 2 is a schematic depiction of a non-limiting example of an authentication system according to one or more embodiments of the invention.

The system 200, depicted in FIG. 2, can be used to implement any method according to one or more embodiments of the invention, and in particular the method 100 in FIG. 1.

More specifically, the system 200 can be used to authenticate a user who wishes to access a web application with a user device 202 running an access client 204, by way of at least one embodiment. The access client 204 can be a web browser executed by the user device 202, or an application client installed on the user device and executed by said user device 202.

The system 200 comprises an application server 210 hosting at least one web application 212 that the user wishes to access. The web application 212 can be any type of application. The web application 212 can be a website, a banking application, an office application, etc.

The application server 210 includes an authentication client 214, which authenticates users wishing to access the web application 212. The authentication client 214 can be of any kind. In a non-limiting example, the authentication client 214 can be configured to perform authentication using the OIDC protocol or the SAML protocol, by way of at least one embodiment.

The system 200 comprises an IDAAS server 220.

The IDAAS server 220 comprises an enrollment client 222 enabling a web application to enroll with said IDAAS server.

The IDAAS server 220 includes an authentication client 224, which authenticates users wishing to access the web application 212. The authentication client 224 can be of any kind. In a non-limiting example, the authentication client 224 can be configured to perform authentication using the OIDC protocol or the SAML protocol.

The system 200 comprises a social authentication server, also known as a social server, 230. The social server 230 comprises an authentication client 232 performing authentication of a user having a user profile, or account, on said social server 230. The authentication client authenticates a user using any known technique, such as login and password, multi-factor authentication, and so on.

The user device 202, the application server 210, the IDAAS server and the social server can be located at different sites, remote from each other.

At least two of these devices, namely the user device 202, the application server 210, the IDAAS server and the social server 230, can be located on the same site.

At least two of these devices, namely the user device 202, the application server 210, the IDAAS server and the social server 230, can communicate with each other via a wired or wireless connection.

At least two of these devices, namely the user device 202, the application server 210, the IDAAS server and the social server 230, can communicate with each other via a communication network, such as the Internet.

The examples given have been described with a single user. Of course, the one or more embodiments of the invention can also be used to authenticate several users.

The examples given have been described with a web application. Of course, the one or more embodiments of the invention can be implemented for user authentication for several applications hosted on the same application server or on different application servers.

In the examples described, the application server hosts a single web application. Of course, the application server can host several web applications.

Generally speaking, the at least one embodiment of the invention is not limited to the examples described, which are given by way of illustration. Numerous variants can be envisaged for the examples given above without departing from the scope of the invention as defined in the main claims.

What is claimed is:

1. A method for authenticating a user to access a web application hosted on an application server, said method comprising:

an authentication phase comprising receiving, by said application server, of a request for access to said web application formulated by the user through a user device;

redirecting said user to a first authentication server comprising an Identity-as-a-Service (IDAAS) server;

selecting, by said user and on said IDAAS server, of a second authentication server comprising a social server, holding personal data of said user;

authenticating said user with said social server;

receiving by said IDAAS server of said personal data of said user transmitted by said social server;

verifying the personal data of said user according to at least one previously entered rule for accessing said web application; and when the personal data satisfies at least one access rule of said at least one previously entered rule, transmitting from said IDAAS server to said application server a proof of authentication authorizing said user to access said web application;

wherein the personal data transmitted by the social server is received by the IDAAS server and is not transmitted to the application server, the IDAAS server generates said proof of authentication based on a result of testing said personal data against said at least one access rule, without including said personal data, the proof of authentication comprises at least one test data item representing said result of said testing of the personal data against said at least one access rule, each test data item of said at least one test data item corresponding to said at least one access rule and without including said personal data, no indication of the web application is transmitted to the social server, the social server cannot determine which web application is being accessed by the user.

2. The method according to claim 1, wherein the proof of authentication comprises an authentication token comprising a temporary identifier assigned to said user by the IDAAS server.

3. The method according to claim 1, wherein the at least one test data item indicates compliance of at least one personal data item of said personal data with said at least one access rule, without including the at least one personal data item corresponding therewith.

4. The method according to claim 3, wherein the authentication phase further comprises, prior to transmitting the at least one test data item, requesting confirmation from said user.

5. The method according to claim 1, further comprising, prior to the authentication phase, enrolling the web application to said IDAAS server, said enrolling indicating said at least one access rule for accessing said web application.

6. The method according to claim 5, wherein the authentication phase further comprises creating a temporary profile for said user on the IDAAS server, and said method further comprises deleting said temporary profile after the authentication phase.

7. The method according to claim 1, wherein the second authentication server comprising said social server is selected from among several social servers listed by the IDAAS server.

8. The method according to claim 1, wherein data exchange between the IDAAS server and the social server is carried out using OpenID Connect (OIDC) or Security Assertion Markup Language (SAML) authentication kinematics between said IDAAS server and said social server.

9. The method according to claim 1, wherein data exchange between the IDAAS server and the application server is carried out using OpenID Connect (OIDC) or Security Assertion Markup Language (SAML) authentication kinematics between said IDAAS server and said application server.

10. The method according to claim 1, further comprising creating a user account on the application server, after the authentication phase.

11. The method according to claim 1, wherein the personal data comprises at least one of an age of the user, a location of the user, a nationality of the user.

12. A non-transitory computer medium storing a program comprising computer instructions, which when executed, implement a method for authenticating a user to access a web application hosted on an application server, said method comprising:

an authentication phase comprising receiving, by said application server, of a request for access to said web application formulated by the user through a user device;

redirecting said user to a first authentication server comprising an Identity-as-a-Service (IDAAS) server;

selecting, by said user and on said IDAAS server, of a second authentication server comprising a social server, holding personal data of said user;

authenticating said user with said social server;

receiving by said IDAAS server of said personal data of said user transmitted by said social server;

verifying the personal data of said user according to at least one previously entered rule for accessing said web application; and when the personal data satisfies at least one access rule of said at least one previously entered rule, transmitting from said IDAAS server to said application server a proof of authentication authorizing said user to access said web application;

wherein the personal data transmitted by the social server is received by the IDAAS server and is not transmitted to the application server, the IDAAS server generates said proof of authentication based on a result of testing said personal data against said at least one access rule, without including said personal data, the proof of authentication comprises at least one test data item representing said result of said testing of the personal data against said at least one access rule, each test data item of said at least one test data item corresponding to said at least one access rule and without including said personal data, no indication of the web application is transmitted to the social server, the social server cannot determine which web application is being accessed by the user.

13. A system configured to authenticate a user to access a web application hosted on an application server, said system comprising:

a first authentication client that manages access to a web application, installed on an application server, a second authentication-as-a-service client installed on an Identity-as-a-Service (IDAAS) server, and a third authentication client comprising a social authentication client installed on a social authentication server;

wherein said system is configured to implement a method for authenticating said user to access said web application hosted on said application server, said method comprising an authentication phase comprising receiving, by said application server, of a request for access to said web application formulated by the user through a user device;

redirecting said user to said IDAAS server;

selecting, by said user and on said IDAAS server, said social authentication server holding personal data of said user;

authenticating said user with said social authentication server;

receiving by said IDAAS server of said personal data of said user transmitted by said social authentication server;

verifying the personal data of said user according to at least one previously entered rule for accessing said web application; and when the personal data satisfies at least one access rule of said at least one previously entered rule, transmitting from said IDAAS server to said application server a proof of authentication authorizing said user to access said web application;

wherein the personal data transmitted by the social server is received by the IDAAS server and is not transmitted to the application server, the IDAAS server generates said proof of authentication based on a result of testing said personal data against said at least one access rule, without including said personal data, the proof of authentication comprises at least one test data item representing said result of said testing of the personal data against said at least one access rule, each test data item of said at least one test data item corresponding to said at least one access rule and without including said personal data, no indication of the web application is transmitted to the social server, the social server cannot determine which web application is being accessed by the user.

* * * * *